United States Patent [19]
Tanaka

[11] Patent Number: 5,154,985
[45] Date of Patent: Oct. 13, 1992

[54] BATTERY WITH A SPARE BATTERY

[75] Inventor: Masafumi Tanaka, Kyoto, Japan

[73] Assignee: Japan Storage Battery Co., Ltd., Kyoto, Japan

[21] Appl. No.: 633,559

[22] Filed: Dec. 24, 1990

[30] Foreign Application Priority Data

Jun. 4, 1990 [JP] Japan .................................. 2-146705

[51] Int. Cl.⁵ .............................................. H01M 10/04
[52] U.S. Cl. ........................................ 429/9; 429/149; 429/158
[58] Field of Search .................... 429/9, 149, 150, 158, 429/159

[56] References Cited

U.S. PATENT DOCUMENTS

| | | | |
|---|---|---|---|
| 3,200,014 | 8/1965 | Roberts | 136/181 |
| 3,758,345 | 9/1973 | Toth | 136/181 |
| 4,559,456 | 12/1985 | Yamamoto et al. | 307/66 |
| 4,684,580 | 8/1987 | Cramer | 429/9 |
| 4,818,928 | 4/1989 | Schosser | 320/2 |
| 4,883,728 | 11/1989 | Witehira | 429/160 |
| 5,002,840 | 3/1991 | Klebnow et al. | 429/9 |

FOREIGN PATENT DOCUMENTS

| | | |
|---|---|---|
| 4104400 | 9/1991 | Fed. Rep. of Germany . |
| 2136224 | 3/1983 | United Kingdom . |
| 2205697 | 6/1987 | United Kingdom . |

OTHER PUBLICATIONS

Copy of the original and English translation thereof of German Patent Office Communication dated Feb. 20, 1992.

Primary Examiner—Mark L. Bell
Assistant Examiner—Alan Wright
Attorney, Agent, or Firm—Sughrue, Mion, Zinn, Macpeak & Seas

[57] ABSTRACT

A battery including a spare battery is provided in which the six cells conventionally used for the spare battery are decreased to three cells, thereby allowing the capacity of the main battery to be increased. No charger for the spare battery is required. The main battery comprises six cells connected in series, the first of the six cells having a capacity at least 10% higher than that the remaining three cells. A switch is used to connect the spare battery in parallel with the remaining three cells of the main battery.

7 Claims, 5 Drawing Sheets

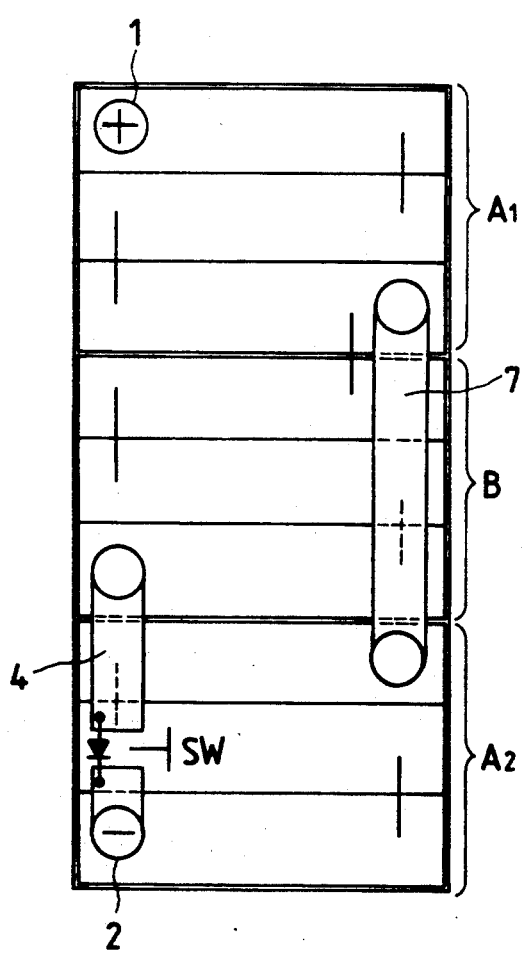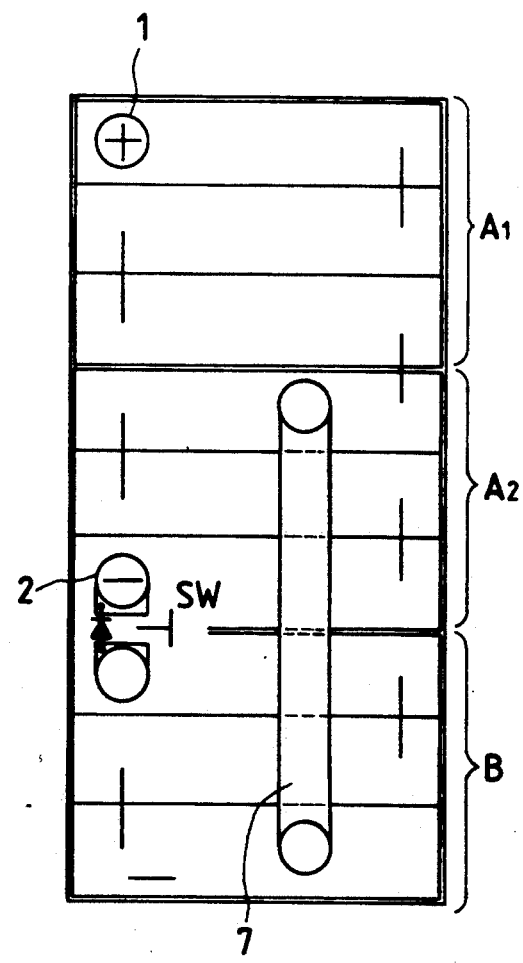

BATTERY WITH A SPARE BATTERY

BACKGROUND OF THE INVENTION

The present invention relates to a battery with a spare battery.

As a countermeasure to prevent against battery depletion due to negligently not switching off a load, such as a lamp switch of an automobile, there is a method in which a spare battery included with a main battery is charged, so that, for example, in the event of main battery failure, an engine can be started. To accomplish such an object, a so-called switch battery was developed in which a main battery and a spare battery are used so that the circuit can be changed in case of emergency. However, since the switch battery uses the main battery and the spare battery, thereby requiring a charger for the spare battery and complicating the circuit connection, it did not gain public attention. Currently, switch batteries having a main battery using six cells and a spare battery using six cells housed in a package are on the market of European countries and the United States. However, the size of this switch battery is the same as that of a conventional 6-cell type battery due to the necessity of compatibility with the conventional 6-cell type battery. Consequently, the main battery is small, and so has a capacity that is approximately 60 to 70% of that of the conventional 6-cell type battery, and a life that is approximately 20 to 30% shorter than that of the conventional battery. Therefore, even though the switch battery seems to offer an excellent advantage in an emergency, it has not been widely used due to disadvantages of small capacity and short life.

SUMMARY OF THE INVENTION

A problem to be solved is how to provide a switch battery with satisfactory capacity and life, but with nearly the same size as the conventional 6-cell type battery. Since battery size has been specified in JIS (Japanese Industrial Standard), switch batteries whose size deviates from the standard cannot be mounted on automobiles due to the restrictions on the size of holders and trays. More specifically, the battery tray has a 20 to 40% tolerance in the lengthwise direction. However, the holder which fastens the battery in the widthwise direction has no tolerance. Although many types of batteries are being put on the market, the battery width is limited to two types. Thus, batteries with various capacities are made by changing the size in the lengthwise direction.

An object of the present invention is to provide a switch battery offering high performance in the present standard battery size.

To accomplish such an object, the battery with a spare battery according to the present invention features a main battery composed of six cells connected in series and a spare battery composed of three cells connected in series. The capacity of a first three cells in the main battery is at least 10% higher than that of the remaining three cells of the main battery. The lower capacity side of the main battery is connected to the spare battery in parallel through a switch, and a diode is connected to the switch in the direction so that the spare battery is charged when the switch is open.

By decreasing the number of cells conventionally used for the spare battery from six to three, the capacity of the main battery can be increased. In addition, when the main battery is fully discharged, electricity remains in the three cells of the large capacity side. Thus, by closing the switch, which connects the main battery and the spare battery in parallel, a voltage of the normal six cells can be obtained between terminals connected to an external load. In the normal state, since the spare battery is charged through a diode, no extra charger for the spare battery is required. Moreover, since the spare battery is connected to the main battery only with a switch operation, the handling of the battery is easy.

BRIEF DESCRIPTION OF THE DRAWINGS

FIGS. 1 to 5 are schematics of the example of disposition of an electrolyte tank, a connection tank, a main battery, a spare battery, and so forth according to an embodiment of a battery with a spare battery of the present invention;

DETAILED DESCRIPTION OF THE PREFERRED EMBODIMENT

Figure 1:
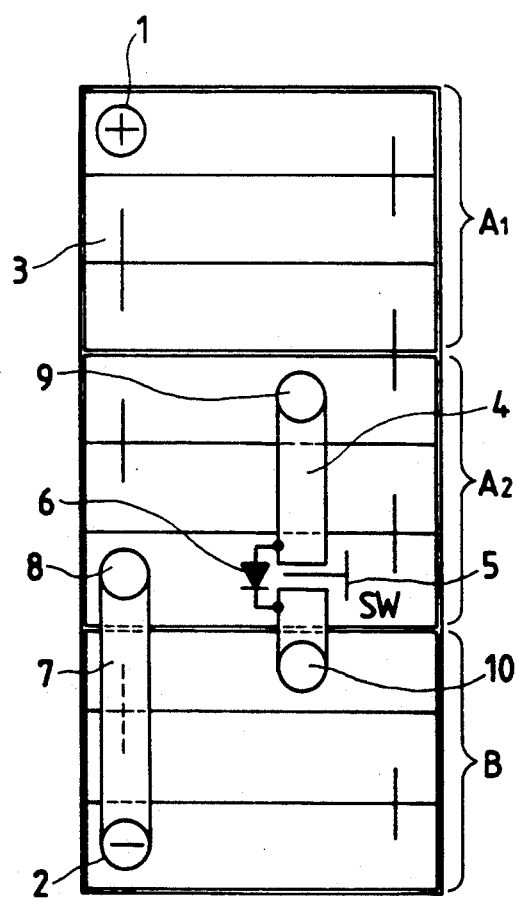
Figure 2:
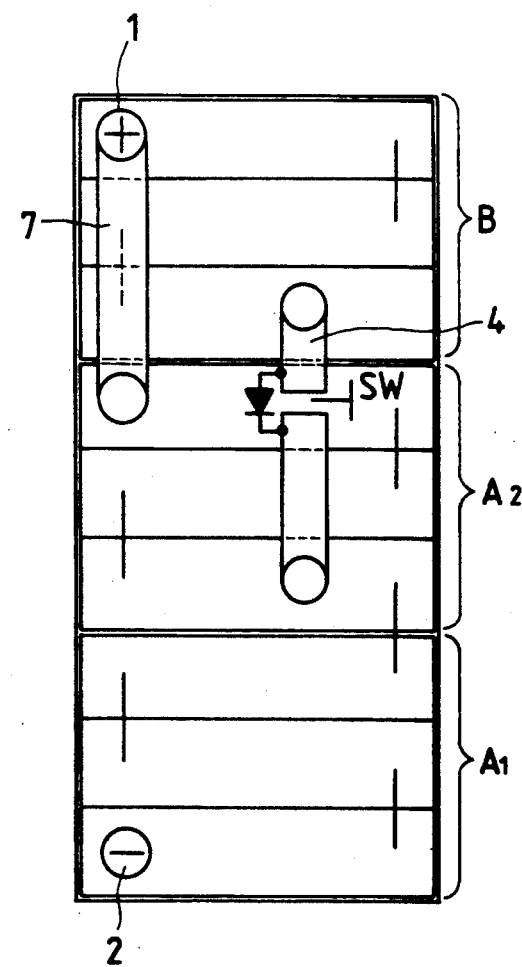
Figure 5:
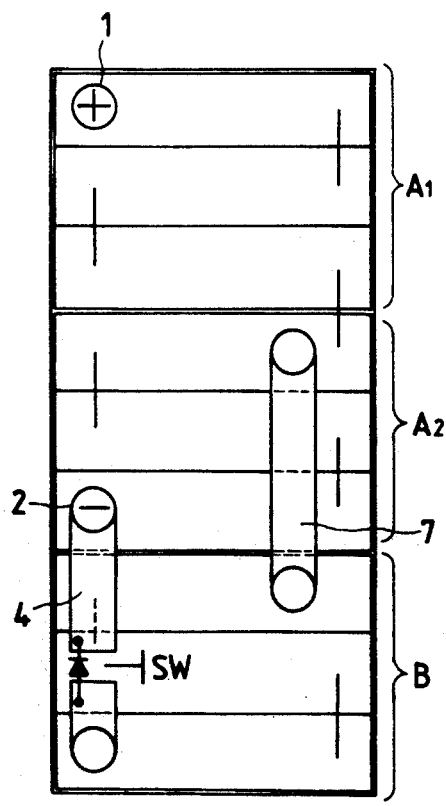

FIGS. 1 to 5 are schematics showing positions of a 9-cell type electrolyte tank, connection cables, terminals, a switch, a diode, a main battery, and a spare battery of an embodiment of a battery with a spare battery according to the present invention, wherein the nine cells are disposed side to side. In the figures, 3-cell blocks A1 and A2 constitute the main battery. The 3-cell block A1 has 10% or more higher capacity than the 3-cell block A2. A 3-cell block B constitutes the spare battery. A positive (+) terminal 1 and a negative (−) terminal 2 are connected to an external load. Cables 3 are connected between cells. A connection cable 4 is connected between the spare battery B and the 3-cell block A2 of the main battery through a switch 5 and a diode 6. A connection cable 7 is connected between the spare battery and the same 3-cell block A2 of the main battery. The connection cable 4, the switch 5, the diode 6, and the connecting cables 3 are disposed on the cover of the electrolyte tank. FIGS. 1 to 5 show examples of various dispositions of the same concept.

Now by referring to FIG. 1, one embodiment will be described. A − terminal 8 of the main battery comprising the 3-cell block A1 and the 3-cell block A2 is connected to a − terminal of the spare battery through the connection cable 7, the − terminal of the main battery being used in common with the external load connection to the − terminal 2. A + terminal 9 of the 3-cell block A2, which has the lower capacity, is connected to a + terminal 10 of the spare battery through the connection cable 4 having the switch 5 and the diode 6. The 3-cell block A2 is connected to the three cells of the spare battery B in parallel. Normally, switch 5 is turned off. In case of emergency, switch 5 is turned on so as to use the spare battery. Since the diode 6 is connected so that current flows in a particular direction, the spare battery is charged when switch 5 is turned off. Thus, in the normal state, the spare battery is charged. According to the present embodiment, since the same size electrode plates are used, a high cost performance is obtained. However, it should be understood that the disposition of the cells can be freely set, and is not limited to that according to the embodiment.

Figure 6:
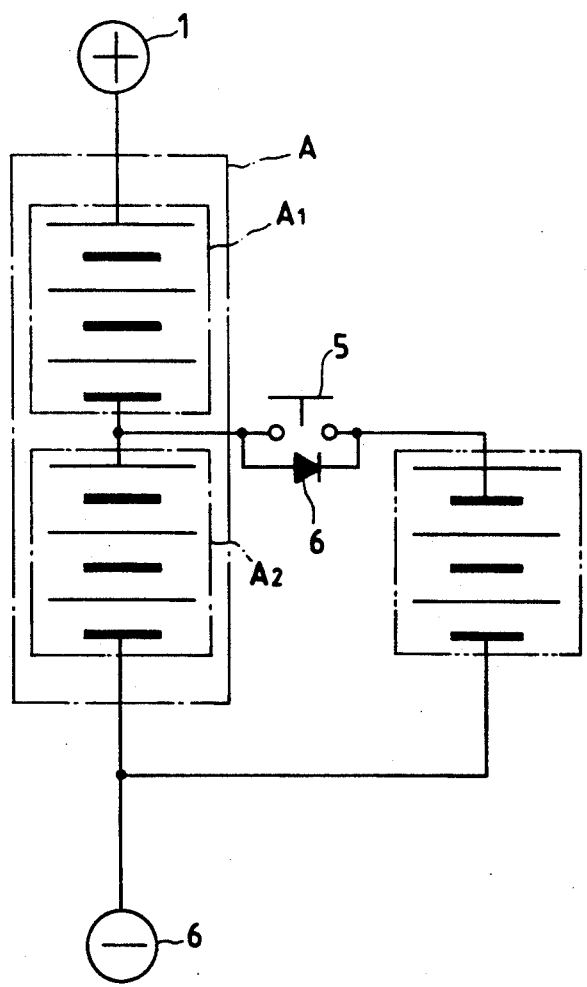
FIGS. 6 to 10 are circuit diagrams according to the embodiment.
Figure 11:
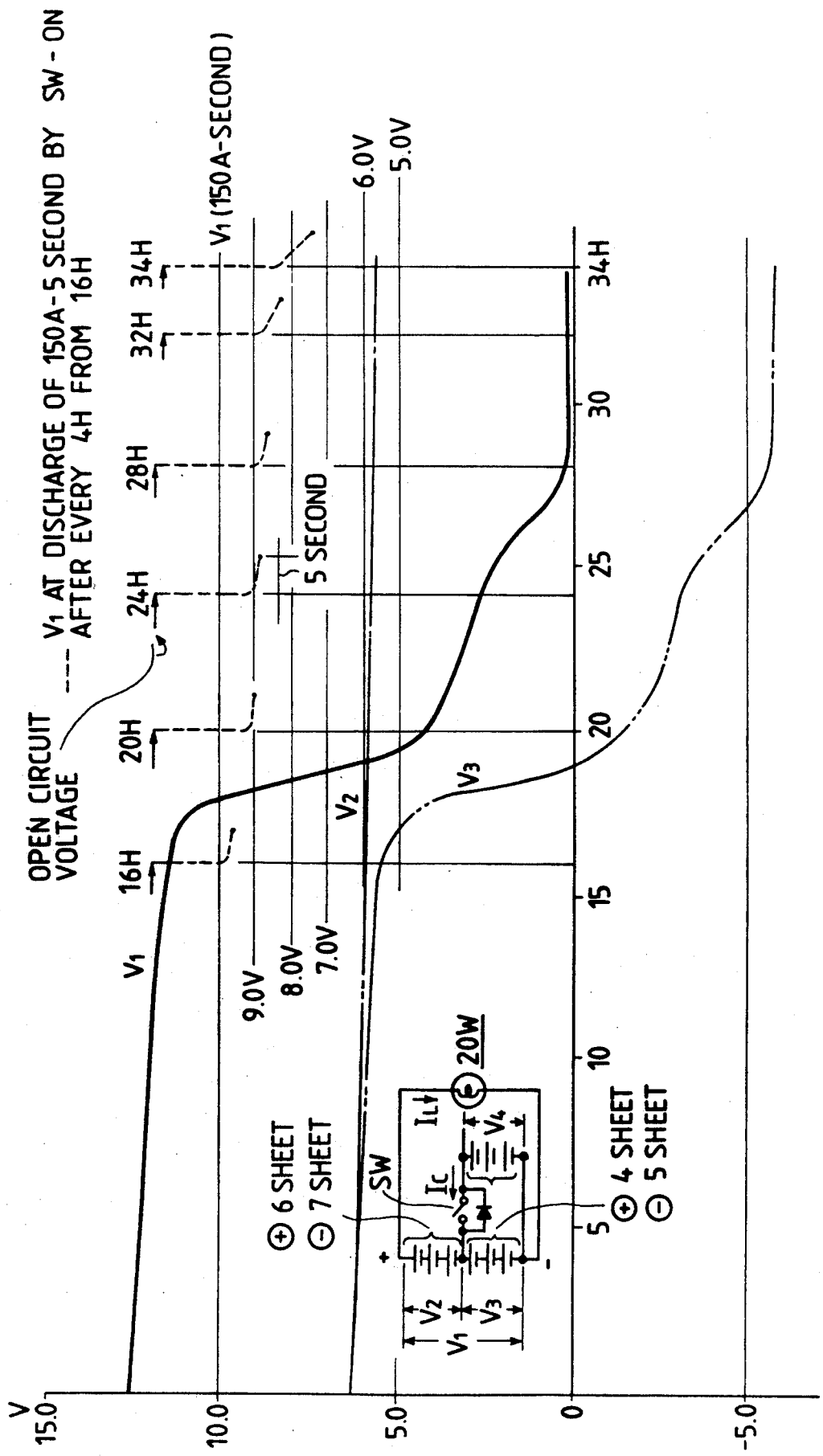
FIG. 11 is a chart showing a discharging property.

Now, by referring to the accompanying circuit diagram and measurement data according to the present embodiment, the operating property of the battery with a spare battery of the present invention will be described in the following. In FIG. 6, main battery A is shown by a one-dot line, 3-cell blocks A1 and A2 are also shown by one-dot lines, and spare battery B is shown by a two-dot line. The 3-cell block A2 with the lower capacity is connected to the spare battery B through the switch 5 and the diode 6 in parallel. The electrode plates used in the embodiment are of a conventional type. While A1 is composed of six + electrode plates and seven − electrode plates, A2 is composed of 4 + electrode plates and 5 − electrode plates. Thus, the capacity of A1 is higher than that of A2. In the embodiment, although the capacity of B is the same as that of A2, it is possible to decrease the capacity of B so that the capacity of B becomes 50% of that of A2. FIG. 11 shows a voltage property where the battery with a spare battery of the aforementioned structure is discharged with an external load of 20 W while the switch is turned off. In the figure, symbol V1 shown by a solid line is a total voltage of the main battery. Symbol V2 shown by a one-dot line is a voltage of the higher capacity 3-cell block A1. Symbol V3 shown by a two-dot line is a voltage of the lower capacity 3-cell block A2. When the total voltage of the main battery becomes nearly 0 V, the amount of current which flows in the 20 W load and is discharged becomes correspondingly weak. Thus, even if the load is connected for a long time, the voltage drop of the 3-cell block A1 is small. Consequently, it can be seen that A1 still has the normal voltage. As shown by the dot line of FIG. 11, a voltage property exists between external load connection terminals through the switch when the spare battery is used in such a condition, namely, the battery voltage drops and thereby the battery does not cause an engine or the like to start up. In this example, 150 A is discharged for 5 sec. after 16 hours at intervals of 4 hours. From the figure, it is obvious that a sufficiently high voltage is obtained between the external load connection terminals. Thus, when the automobile battery stores 10 to 20% of the full electricity, the engine can be started up. Unless the driver forgets to turn off the lamps of the automobile, the battery capacity will not rapidly decrease. In addition, since recent automobiles are provided with a lamp alarm, the engine start up trouble due to negligence of turning off the lamps will not normally occur. The engine start up trouble may occur in the cases of degradation of the battery property due to a decrease in external temperature and overload during driving. According to the present invention, even if the main battery is fully discharged, the 3-cell block with high capacity of the main battery still stores 10 to 20% of the full electric capacity. For example, when the main battery 1 still stores around 10% of the full electric capacity, if the discharge current necessary for starting up the engine is 100 A for 5 sec, a voltage of 1.0 to 1.2 V per cell can be obtained. On the other hand, in the fully charged state, a voltage of 1.7 to 1.8 V per cell can be obtained. At that time, the voltage of A1 of the main battery is 1.0 V/cell×3 cells=3 V. In addition, since the block A2 of the main battery is connected to the spare battery in parallel, a voltage of 1.7 V/cell×3 cells=5.1 V takes place. Thus, a total of 8.1 V is obtained between the main battery terminals, the voltage being satisfactorily higher than the minimum engine start up voltage, 7.3 V. Thus, in the structure of the main battery using six cells and the spare battery using three cells, it is verified that the battery with a spare battery works satisfactorily in comparison with the conventional structure of the main battery using six cells and the spare battery using six cells.

Figure 7:
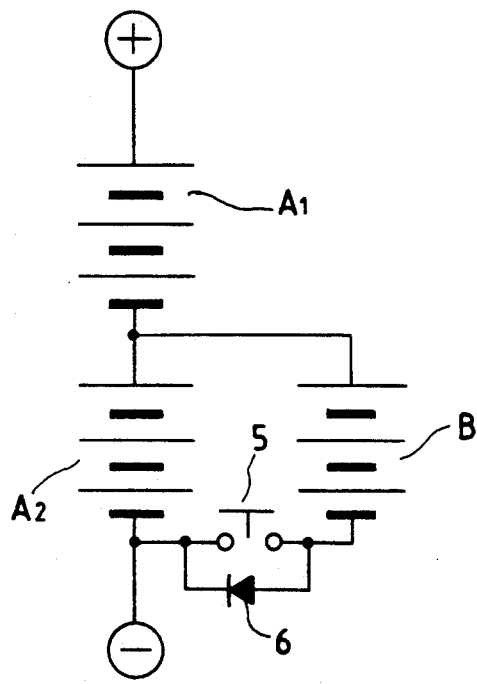

FIG. 7 is a circuit diagram where the switch and the diode are connected in a different manner from that in FIG. 6. In this circuit, when the switch 5 is turned off, the spare battery B is charged through the diode 6. The charging current which flows from A1 is branched to A2 and the spare battery B. However, since the spare battery is not discharged in other than an emergency state, it is always in the fully charged state. Thus, most of charging current is spent for that of A2. Consequently, even if the charging power for the spare battery is withdrawn from the center point of the main battery, insufficient charging does not occur in A2. In addition, since the charging voltage of A2 increases to 7.5 V (2.5 V/cell×3 cells=7.5 V) at most, the charging voltage of the spare battery becomes 6.7 V (7.5 V−0.8 V (diode drop)=6.7 V (2.23 V/cell). Thus, after the spare battery is discharged, it cannot be quickly charged. To enable faster charging, when a Schottky diode is used for the diode, the drop voltage in the diode forward direction decreases to 0.3 V and thereby the charging time remarkably improved. At that time, a satisfactory charging voltage of 7.2 V (2.4 V/cell) can be obtained.

Figure 8:
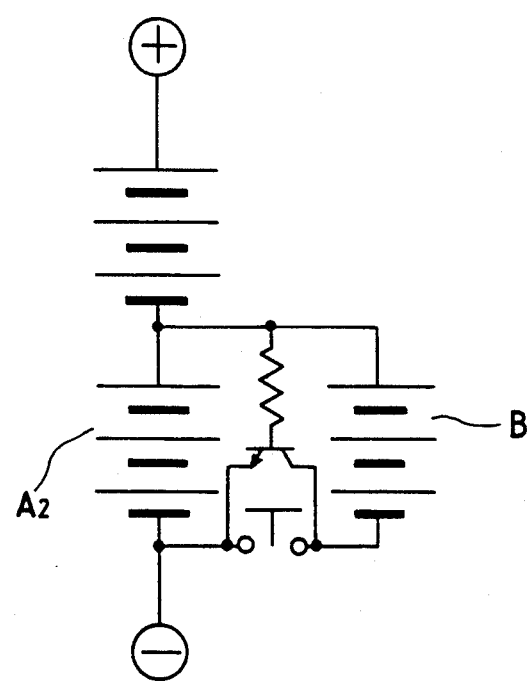
Figure 9:
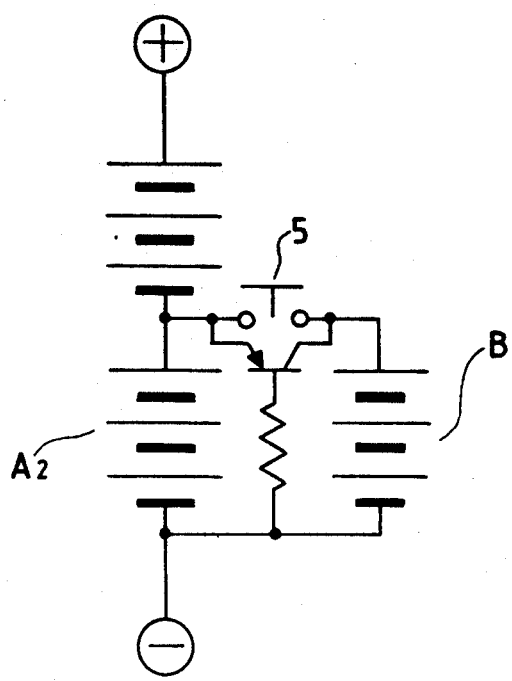

FIGS. 8 and 9 are circuit block diagrams where a transistor is placed at the diode inserted section. While the forward drop voltage of a conventional diode is 0.7 V, the drop voltage of a Schottky diode is 0.3 V. On the other hand, when the transistor is the voltage between the collector and the emitter drops to 0.1 V. Thus, even if the charging voltage of the block A2 is 7.5 V or less, the spare battery B is charged like the block A2. However, since the base current should be supplied to the transistor, a self discharge of several mA takes place.

Figure 10:
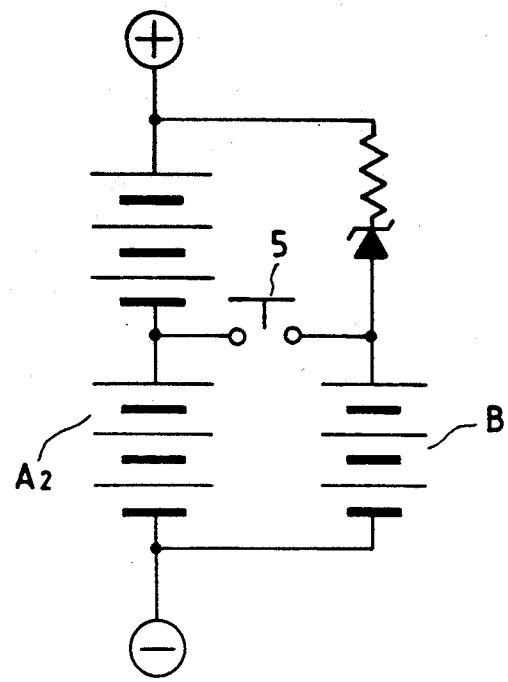

FIG. 10 is a circuit diagram where a constant voltage element shown in FIG. 10 as a zener dioxide is connected in series between the positive terminal of the spare battery B and the positive terminal connected to the external load. In this circuit, when the main battery is charged and thereby the positive voltage increases, a charging current flows in the constant voltage element. Conversely, when the voltage of the main battery drops to the open circuit voltage or less, the element blocks the charging from the main battery to the spare battery and thereby preventing the main battery from being discharged.

As described above, according to the present invention, since the six cells conventionally used for the spare battery are decreased to three cells, the capacity of the main battery can be increased. In addition, no charger for the spare battery is required. Thus, the disadvantages of the- conventional battery with a spare battery, comprising a main battery using six cells and a spare battery using six cells, can be significantly improved and the industrial value dramatically increased.

While the invention has been described in detail above with reference to a preferred embodiment, various modifications within the scope and spirit of the invention will be apparent to people of working skill in this technological field. Thus, the invention should be considered as limited only by the scope of the appended claims.

I claim:

1. A battery including a spare battery, comprising:
a main battery comprising six cells connected in series, a capacity of a first three of said six cells being at least 10% than that of the remaining three cells of said main battery;

a spare battery comprising three cells connected in series; and a switch connecting said spare battery in parallel only with said remaining three cells of said main battery.

2. A battery including a spare battery as claimed in claim 1, further comprising:

a diode connected in parallel with said switch so that said spare battery is charged when said switch is turned off, and said spare battery is a power source when said switch is turned on.

3. A battery including a spare battery as claimed in claim 1, wherein said first three cells of said six cells of said main battery comprise six positive electrode plates and seven negative electrode plates, and said remaining three cells of said main battery comprise four positive electrode plates and five negative electrode plates.

4. A battery including a spare battery as claimed in claim 2, further comprising:

a plurality of first cables connected between adjacent cells of said main battery;

a second cable connected between said spare battery and said remaining three cells of said main battery through said switch and said diode; and a third cable connected between said spare battery and said remaining three cells of said main battery;

wherein said first and second cables, said switch, and said diode are disposed on a cover of an electrolytic tank.

5. A battery including a spare battery as claimed in claim 2 wherein said diode is a Schottky diode.

6. A battery including a spare battery as claimed in claim 1, further comprising a transistor connected to said switch wherein said switch is disposed between an emitter and a collector of said transistor.

7. A battery including a spare battery as claimed in claim 1, said main battery having positive and negative terminals connected to an external load, further comprising a constant voltage element connected between a positive terminal of said spare battery and said positive terminal of said main battery.

* * * * *